(12) United States Patent
Jiko et al.

(10) Patent No.: US 8,309,195 B2
(45) Date of Patent: Nov. 13, 2012

(54) READ-ONLY OPTICAL INFORMATION RECORDING MEDIUM

(75) Inventors: Norihiro Jiko, Kobe (JP); Junichi Nakai, Kobe (JP); Yuki Tauchi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 316 days.

(21) Appl. No.: 12/679,170

(22) PCT Filed: Sep. 16, 2008

(86) PCT No.: PCT/JP2008/066669
§ 371 (c)(1),
(2), (4) Date: Mar. 19, 2010

(87) PCT Pub. No.: WO2009/038046
PCT Pub. Date: Mar. 26, 2009

(65) Prior Publication Data
US 2010/0226240 A1 Sep. 9, 2010

(30) Foreign Application Priority Data

Sep. 19, 2007 (JP) ................................ 2007-242870

(51) Int. Cl.
*B32B 3/02* (2006.01)

(52) U.S. Cl. .................. 428/64.1; 428/64.4; 430/270.12

(58) Field of Classification Search ................ 428/64.4; 430/270.12
See application file for complete search history.

(56) References Cited

U.S. PATENT DOCUMENTS

| | | | |
|---|---|---|---|
| 5,948,497 A | 9/1999 | Hatwar et al. | |
| 5,976,641 A * | 11/1999 | Onishi et al. | 428/1.3 |
| 6,007,889 A | 12/1999 | Nee | |
| 6,229,785 B1 | 5/2001 | Kitaura et al. | |
| 6,280,811 B1 | 8/2001 | Nee | |
| 6,451,402 B1 | 9/2002 | Nee | |
| 6,667,088 B2 * | 12/2003 | Miki | 428/823.1 |
| 6,689,444 B2 | 2/2004 | Nakai et al. | |
| 6,697,323 B1 * | 2/2004 | Miki | 369/275.1 |
| 6,879,548 B2 * | 4/2005 | Yamakage | 369/13.38 |

(Continued)

FOREIGN PATENT DOCUMENTS

JP 4 28032 1/1992
(Continued)

OTHER PUBLICATIONS

U.S. Appl. No. 13/062,384, filed Mar. 4, 2011, Jiko, et al.
(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

An optical information recording medium of the present invention is a read-only optical information recording medium in which at least one reflective film formed of an Al-based alloy and at least one light transmission layer are successively laminated on a substrate. The arithmetical mean roughness of the reflective film is 0.5 nm or less, and the thickness of the reflective film is 25 nm or more. The optical information recording medium of the present invention is the read-only optical information recording medium including the reflective film which has a high reflectivity and low jitter, preferably has excellent durability, and is used particularly appropriately in an optical disc using a blue laser such as BD-ROM or HD DVD-ROM.

4 Claims, 1 Drawing Sheet

U.S. PATENT DOCUMENTS

| | | | |
|---|---|---|---|
| 7,022,384 B2 | 4/2006 | Fujii et al. |
| 7,203,003 B2 | 4/2007 | Nakai et al. |
| 7,419,711 B2 | 9/2008 | Tauchi et al. |
| 7,452,604 B2 | 11/2008 | Takagi et al. |
| 7,476,431 B2 | 1/2009 | Tauchi et al. |
| 7,507,458 B2 | 3/2009 | Takagi et al. |
| 7,514,037 B2 | 4/2009 | Tauchi et al. |
| 7,517,575 B2 | 4/2009 | Fujii et al. |
| 7,566,417 B2 | 7/2009 | Tauchi et al. |
| 2002/0034603 A1 | 3/2002 | Nee |
| 2002/0122913 A1 | 9/2002 | Nee |
| 2003/0138591 A1 | 7/2003 | Nee |
| 2003/0215598 A1 | 11/2003 | Nee |
| 2004/0018334 A1 | 1/2004 | Nee |
| 2004/0110087 A1 | 6/2004 | Ozawa et al. |
| 2004/0151866 A1 | 8/2004 | Nee |
| 2004/0151867 A1 | 8/2004 | Nee |
| 2004/0191463 A1 | 9/2004 | Nee |
| 2004/0226818 A1 | 11/2004 | Takagi et al. |
| 2004/0238356 A1 | 12/2004 | Matsuzaki et al. |
| 2004/0258872 A1 | 12/2004 | Nee |
| 2005/0042406 A1 | 2/2005 | Nee |
| 2005/0112019 A1* | 5/2005 | Nakai et al. ............ 420/550 |
| 2005/0153162 A1 | 7/2005 | Takagi et al. |
| 2005/0170134 A1 | 8/2005 | Nee |
| 2005/0238839 A1 | 10/2005 | Takagi et al. |
| 2005/0286401 A1 | 12/2005 | Oyake et al. |
| 2006/0013988 A1 | 1/2006 | Tauchi et al. |
| 2006/0171842 A1 | 8/2006 | Tauchi et al. |
| 2006/0177768 A1 | 8/2006 | Tauchi et al. |
| 2006/0182991 A1 | 8/2006 | Tauchi et al. |
| 2007/0020139 A1 | 1/2007 | Tauchi et al. |
| 2007/0020426 A1 | 1/2007 | Nakai et al. |
| 2007/0141296 A1 | 6/2007 | Nakano et al. |
| 2008/0075910 A1 | 3/2008 | Ohwaki et al. |
| 2008/0131308 A1 | 6/2008 | Tsubota et al. |
| 2008/0253271 A1* | 10/2008 | Miki et al. ............ 369/275.4 |
| 2008/0317993 A1 | 12/2008 | Tauchi et al. |
| 2009/0022044 A1 | 1/2009 | Sakamoto et al. |
| 2009/0057140 A1 | 3/2009 | Takagi et al. |
| 2009/0057141 A1 | 3/2009 | Tauchi et al. |
| 2009/0061142 A1 | 3/2009 | Tauchi et al. |
| 2009/0075109 A1 | 3/2009 | Tauchi et al. |
| 2009/0139860 A1 | 6/2009 | Matsuzaki |
| 2010/0038233 A1 | 2/2010 | Takagi et al. |

FOREIGN PATENT DOCUMENTS

| | | |
|---|---|---|
| JP | 4 252440 | 9/1992 |
| JP | 5 258363 | 10/1993 |
| JP | 6 208732 | 7/1994 |
| JP | 6 302027 | 10/1994 |
| JP | 7-130007 | 5/1995 |
| JP | 2000 57627 | 2/2000 |
| JP | 2001 184725 | 7/2001 |
| JP | 2001-312840 | 11/2001 |
| JP | 2002-230840 | 8/2002 |
| JP | 2003 160826 | 6/2003 |
| JP | 2004 79131 | 3/2004 |
| JP | 2004 158145 | 6/2004 |
| JP | 2006 66003 | 3/2006 |
| JP | 2006-294194 | 10/2006 |
| JP | 2006-294194 A | 10/2006 |
| JP | 2007 92153 | 4/2007 |
| TW | 187194 | 5/1982 |
| WO | 98 09823 | 3/1998 |

OTHER PUBLICATIONS

U.S. Appl. No. 13/062,874, filed Mar. 8, 2011, Tauchi, et al.
U.S. Appl. No. 13/128,415, filed May 10, 2011, Tauchi, et al.
U.S. Appl. No. 12/866,230, filed Aug. 4, 2010, Jiko, et al.
U.S. Appl. No. 12/767,325, filed Apr. 26, 2010, Nakai, et al.
U.S. Appl. No. 12/625,022, filed Nov. 24, 2009, Matsuzaki, et al.
U.S. Appl. No. 12/513,254, filed May 1, 2009, Sakamoto, et al.
U.S. Appl. No. 13/257,767, filed Sep. 20, 2011, Shida, et al.
Notification of Reason(s) for Refusal issued May 10, 2011, in Japan Patent Application No. 2007-242870 (with English translation).
European Search Report mailed on Mar. 20, 2012, issued for EPO Application No. EP 08 83 1547.
Taiwanese Office Action issued Jan. 12, 2012, in Patent Application No. 097136163 (with English-language translation).

* cited by examiner

READ-ONLY OPTICAL INFORMATION RECORDING MEDIUM

TECHNICAL FIELD

The present invention relates to a read-only optical information recording medium such as, e.g., CD-ROM, DVD-ROM, BD (Blue Ray Disc)-ROM, or HD DVD-ROM, and particularly to a read-only optical information recording medium from which reading is performed using a blue laser, such as BD or HD DVD.

BACKGROUND ART

Optical information recording media are generally classified into three types which are a read-only type, a write-once type, and a rewritable type based on the principle of recording and reading.

FIG. 1 schematically shows a representative structure of a read-only optical disc. As shown in FIG. 1, the read-only optical disc has the structure in which a reflective film 2 containing Ag, Al, Au, or the like as a main component thereof and a light transmission layer 3 are successively laminated on a substrate 1 of a transparent plastic resin or the like. On the substrate 1, information based on a combination of projecting/depressed lands/pits (recorded data) is recorded, and a substrate made of polycarbonate having a thickness of 1.1 mm and a diameter of 12 cm, e.g., is used. The light transmission layer 3 is formed by sticking a light transmissive sheet or coating/curing a light transmissive resin. The reading of the recorded data is performed by detecting the phase difference or reflection difference of a laser beam applied to an optical disc.

In FIG. 1, there is shown a single-layer optical disc in which the reflective film 2 and the light transmission layer 3 are formed on the substrate 1 on which the information based on the projecting/depressed lands/pits (recorded data) is recorded. However, as shown in FIG. 2, there can be also used, e.g., a double-layer optical disc including a first information recording surface 11 and a second information recording surface 12. Specifically, the double-layer optical disc of FIG. 2 has a structure in which a first reflective film 2A, a first light transmission layer 3A, a second reflective film 2B, and a second light transmission layer 3B are successively laminated on the substrate 1 on which the information based on a combination of the projecting/depressed lands/pits (recorded data) is recorded. In the first light transmission layer 3A, information different from the information recorded on the substrate 1 is recorded based on a combination of pits/lands.

For reflective films used in optical discs, Au, Cu, Ag, Al, and an alloy containing any of these elements as a main component thereof have been used generally heretofore.

Among them, a reflective film of an Au-based alloy containing Au as a main component thereof has the advantages of excellent chemical stability (durability) and a small time-dependent change in recording characteristic, but is extremely expensive. In addition, there is also a problem that a sufficiently high reflectivity cannot be obtained to a blue laser (at a wavelength of 405 nm) used in recording/reading to/from BD or HD DVD. A Cu-based alloy containing Cu as a main component thereof is inexpensive, but poorest in durability among the conventional reflective film materials. In addition, the Cu-based alloy has a drawback of a low reflectivity to a blue laser, similarly to Au, so that the use thereof is limited. By contrast, a reflective film of an Ag-based alloy containing Ag as a main component thereof shows a sufficiently high reflectivity to light in the range of 400 to 800 nm which is a practically used wavelength region, and also has excellent durability. Therefore, the Ag-based alloy is widely used in optical discs using a blue laser.

On the other hand, a reflective film of an Al-based alloy containing Al as a main component thereof is inexpensive and has a sufficiently high reflectivity to light at a wavelength of 405 nm, but has durability inferior to those of Ag type and Au type reflective films. Accordingly, in the case of coating the Al-based alloy reflective film onto DVD-ROM, the thickness of the reflective film is sufficiently increased to a level of approximately 40 nm to improve durability. However, there has been a problem that, when an Al type reflective film having such a thickness is applied to BD-ROM, HD DVD-ROM, or the like which uses a blue laser, the accuracy of a recording signal (reading signal) decreases (i.e., jitter increases), and stable reading cannot be performed.

To enhance the durability and reading stability of the Al-based alloy reflective film, there have been proposed methods shown in, e.g., Patent Documents 1 to 4.

Among them, Patent Document 1 discloses an optical disc having an optical disc substrate formed with pit rows having pits in accordance with a recording signal, a reflective film deposited on the surface thereof where the pits are formed, and a light transmission layer formed on the reflective film. In the optical disc, the pit rows viewed from the light transmission layer include the pits having lengths and widths of 250 nm or less, and the thickness of the reflective film of Al, Ag, or Au is reduced to 20 nm or less. In general, the miniaturization of the pits causes the degradation of signal reading but, in Patent Document 1, the problem of jitter deterioration is circumvented by controlling the thickness of the reflective film to 20 nm or less. However, there is a problem that, when the thickness of the reflective film is reduced to 20 nm or less, sufficient durability in terms of practical use cannot be obtained.

In Patent Document 2, a technology is disclosed which controls pits formed in the surface of a substrate and the space between the pits in association with the length of the substrate, and thereby improves the jitter characteristic of a reading signal.

In Patent Document 3, an optical disc including an Al reflective layer (having a thickness of 100 nm) containing Ta in an amount of 4 percent is disclosed as a read-only optical disc having excellent durability even under conditions in which temperature and humidity abruptly change in the section of Examples.

In Patent Document 4, an Al-based alloy reflective film is disclosed which contains each of Cr, Fe, and Ti in an amount of 1 to 4 percent. By providing an alloy with such a composition, it is possible to obtain a reflective film having a high reflectivity, a flat and smooth surface (having Ra of about 5 to 10 nm), a small growth of crystal grains resulting from a temperature change, and a small reflectivity change.

[Patent Document 1] International Publication Pamphlet WO 00/65584

[Patent Document 2] JP-A No. 66003/2006

[Patent Document 3] JP-B2 No. 62919/1995

[Patent Document 4] JP-A No. 092153/2007

DISCLOSURE OF THE INVENTION

A reflective film for optical disc is required to have not only a high reflectivity, but also high-quality signal write/read characteristics such as low jitter (smaller fluctuations of a reading signal along a time axis).

The reflective film for optical disc is also required to cause only a slight change in the characteristic (durability) of a disc when the reflective film is held under a high-temperature and high-humidity acceleration environment. In recent years, increasingly higher demand has been placed on the durability of a reflective film for optical disc. In particular, in an optical disc using a blue laser such as BD-ROM or HD DVD-ROM, higher durability (smaller time-dependent deterioration) is required of a reflective film. This is because, in a BD-ROM, e.g., a light transmission layer formed on the side of a reflective film serving as the incident side of a laser beam for reading has a thickness of about 100 μm, which is thinner than the reflective film of CD or DVD as a conventional disc, and the effect of protecting the reflective film provided by the light transmission layer is small.

The present invention has been achieved in view of the circumstances described above, and an object of the present invention is to provide a read-only optical information recording medium including a reflective film which has a high reflectivity and low jitter, preferably has excellent durability, and is used particularly appropriately in an optical disc using a blue laser such as BD-ROM or HD DVD-ROM.

A read-only (reading-only) optical information recording medium that has succeeded in solving the problems described above is a read-only optical information recording medium in which at least one reflective film formed of an Al-based alloy and at least one light transmission layer are successively laminated on a substrate, and has a gist in that an arithmetical mean roughness Ra of the reflective film is 0.5 nm or less, and a thickness of the reflective film is 25 nm or more.

In a preferred embodiment, the Al-based alloy comprises 7.0 to 20 at % in total amount of at least one element selected from the group consisting of Ti, Ta, Cr, W, Mo, Nb, and V.

In a preferred embodiment, the Al-based alloy comprises 4 to 20 at % in total amount of at least one element selected from the group consisting of Ti, Ta, Cr, W, Mo, Nb, and V, and comprises 5 to 15 at % in total amount of a rare earth element.

In a preferred embodiment, reading of information is performed using a blue laser.

According to the present invention, there can be provided a read-only optical information recording medium which has a high reflectivity and low jitter, and preferably also has excellent durability.

In a preferred embodiment of the present invention, the read-only optical information recording medium has a low jitter value not only before an acceleration environment test, but also after the acceleration environment test. Therefore, the read-only optical information recording medium having extremely excellent signal write/read characteristics (reading stability) can be obtained.

The optical information recording medium of the present invention is used particularly appropriately in an optical disc using a blue laser such as BD-ROM or HD DVD-ROM.

EXPLANATIONS OF LETTERS AND NUMERALS

Figure 1:
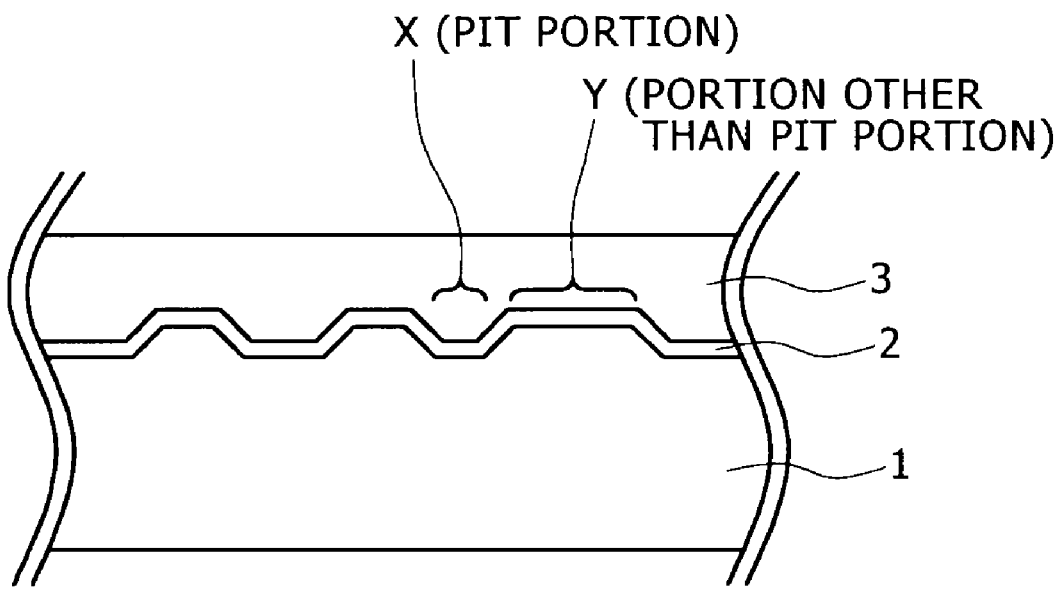
FIG. 1 is a cross-sectional view schematically showing a principal portion in a circumferential direction of a read-only optical disc (single-layer optical disc).
Figure 2:
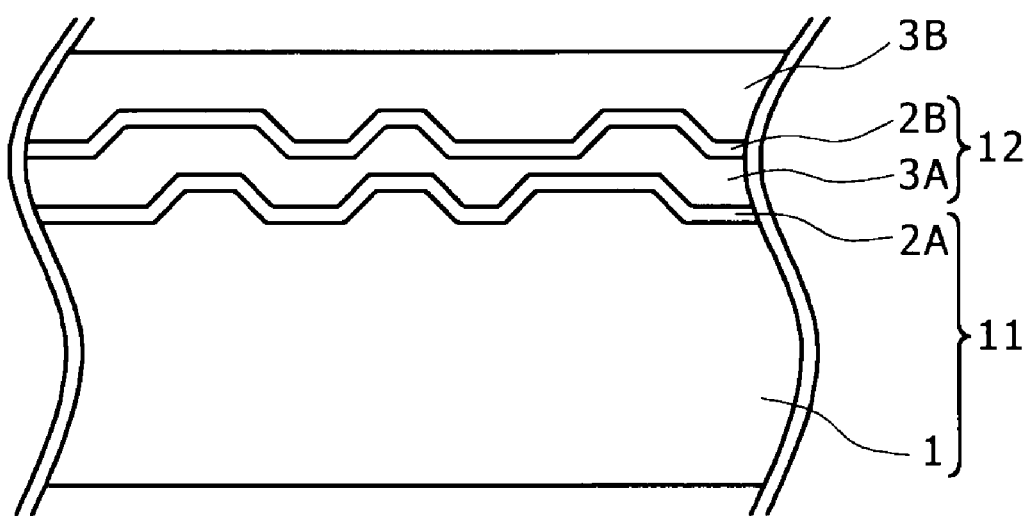
FIG. 2 is a view schematically showing a principal portion in a circumferential direction of another read-only optical disc (double-layer optical disc).

1 Substrate
2 Reflective Film
3 Light Transmission Layer
2A First Reflective Film
2B Second Reflective Film
3A First Light Transmission Layer
3B Second Light Transmission Layer
11 First Information Recording Surface
12 Second Information Recording Surface

BEST MODE FOR CARRYING OUT THE INVENTION

To provide an Al-based alloy reflective film which has excellent reading stability due to its high reflectivity and low jitter, and preferably also has excellent durability, the present inventors have performed study by particularly focusing attention on the thickness and surface roughness of a reflective film.

As a result, the present inventors have found that:

(A) even when the thickness of the Al reflective film is increased to 25 nm or more, jitter (fluctuations) can be kept small if the arithmetical mean roughness (Ra) of the reflective film is reduced to refine (flatten and smoothen) the surface thereof; and (B) a jitter improving action based on the Ra control described above can be effectively achieved even after an acceleration environment test. The Al crystal structure of a reflective film having small Ra has been refined, and the grow of Al crystal grains when the reflective film is held under a high-temperature and high-humidity environment is also inhibited so that the increase of Ra after the acceleration environment test is inhibited, and jitter does not increase.

The present inventors have also found that:

(C) for the Ra control, proper control of the composition of an Al-based alloy is preferable and effective and, by such control, not only a sufficiently high reflectivity (reflection intensity) can be obtained, but also durability (a low change rate of reflection intensity after the reflective film is held under a high-temperature and high-humidity environment) is enhanced.

Thus, according to the present invention, the control of Ra not only reduces jitter and improves reading stability, but also achieves the extremely excellent effect of improving a reflection characteristic and durability through proper control of the composition of the alloy for the Ra control.

Details of a basic experiment leading to the present invention are as follows.

First, single-layer BD-ROM discs were produced by depositing various Al alloy thin films having different thicknesses on polycarbonate substrates formed with pits/lands by a sputtering method using Al-based alloy sputtering targets having various compositions, and then depositing light transmission layers of a UV setting resin. Then, the reflection intensity and jitter of each of the discs after the production thereof were measured, and the reflection intensity and jitter thereof after an acceleration environment test was performed were measured.

As a result, in the BD-ROM, when the thickness of the Al-based alloy reflective film was approximately 15 nm or more, reflectivity was good due to a large number of layers of metal Al, but jitter (fluctuations) significantly increased. On the other hand, when the thickness of the reflective film was about 15 nm or less, low jitter was obtained, while reflectivity decreased. In particular, when a transparent Al oxide film grew deep into the reflective film due to the acceleration environment test, the number of layers of metal Al increasingly decreased so that the reduction reflectivity became noticeable.

In view of the foregoing, the present inventors performed further study to provide an Al reflective film which had low jitter even when the thickness of the reflective film was increased, and preferably allows jitter to be reduced both before and after an acceleration environment test. As a result, it was found that, when the arithmetical mean roughness (Ra) of the Al reflective film is extremely reduced to 0.5 nm or less, the intended object was attainable. Note that, in JP-A No. 092153/2007 also, the Al reflective film having small Ra is described but, in Examples thereof, only an example in which Ra is about 5 to 10 nm is disclosed, and Ra (Ra≦0.5 nm) on an ultimately small level defined in the present invention has not been achieved.

When attention is focused on the relationship between the thickness of an Al-based alloy reflective film and the Ra thereof, the Ra generally tends to increase as the film thickness increases. However, according to the present invention, the Ra could be reduced to a level of 0.5 nm or less even though the film thickness was increased to 25 nm or more. The achievement of such ultimately reduced Ra is extremely useful in the case where the Al-based alloy reflective film is applied to an optical information recording medium in which the reflective film and a light transmission layer are successively formed on a substrate formed with pits/lands and which preferably uses a blue laser, as in the present invention. In the optical information recording medium having the structure described above, a signal is read by causing a laser to be incident from the side with the light transmission layer so that, when the surface roughness (Ra) of the surface of the reflective film is large, signal quality deteriorates. In particular, in the optical information recording medium using a blue laser, it is necessary to further flatten and smoothen the surface of the reflective film due to a short wavelength of the blue laser. However, the Al-based alloy reflective film used in the present invention allows retention of high signal quality even with respect to a blue laser.

In the present specification, "having excellent reading stability" means that, when a jitter value is measured by a method described later in the section of Examples, a level of 12 percent or less is satisfied. Preferably, "having excellent reading stability" means an optical information recording medium having jitter values before and after an acceleration environment test each of which satisfies a level of 12 percent or less when the acceleration environment test is performed in which the optical information recording medium is held in an environment at a temperature of 80° C. and a relative humidity of about 85 percent for 240 hours.

In the present specification, "having excellent durability" means an Al-based alloy reflective film in which the rate (absolute value) of change of reflection intensity is 10.0 percent or less when the reflection intensities thereof before and after the acceleration environment test described above are measured by the method described later in the section of Examples.

Hereinbelow, a reflective film (Al-based alloy reflective film) formed of an Al-based alloy used in the present invention will be described in detail.

It is assumed that each percentage (%) shown in the present specification represents atomic percentage unless otherwise noted.

The Al-based alloy reflective film described above satisfies the levels of Arithmetic Mean Roughness Ra: 0.5 nm or less and Thickness: 25 nm or more.

(Arithmetical Mean Roughness Ra: 0.5 nm or Less)

By ultimately reducing the Ra of the Al-based alloy reflective film to 0.5 nm or less, jitter is reduced, and reading stability is improved. Smaller Ra is more preferred. Ra is preferably 0.4 nm or less and, more preferably, 0.3 mm or less.

The portion of the Al-based alloy reflective film where Ra is measured differs depending on the shape of the substrate. For example, in the case of depositing the Al-based alloy reflective film on a substrate in which information based on a combination of lands/pits is recorded, the arithmetical mean roughness at the region ("Y" in FIG. 1) of the reflective film other than the pit portion (depressed portion, which is "X" in FIG. 1) is measured, and determined to be the "Ra of the Al-based alloy reflective film". On the other hand, in the case where the roughness of the reflective film is not affected by the shape of the substrate such as the case where the Al-based alloy reflective film is deposited on a flat and smooth substrate, the portion subjected to the measurement is not limited, and the arithmetical mean roughness of the reflective film is determined to be the "Ra of the Al-based alloy reflective film".

The measurement of Ra was performed using a scanning probe microscope (Nanoscope IIIa for large sample commercially available from Digital Instruments, Inc.) in an AFM (Atomic Force Microscope mode). Specifically, in the case of measuring Ra by area analysis, it is preferred to perform the measurement in an area of approximately 0.5 μm×0.5 μm to 5 μm×5 μm. In the case of measuring Ra by line analysis, it is preferred to set an evaluation length to 1 μm or more, and set the upper limit thereof to about 5 μm. Because higher-accuracy Ra was obtainable by area analysis than by line analysis, area analysis was performed with respect to an area of 2.5 μm×2.5 μm in the examples described later.

(Thickness: 25 Nm or More)

As described above, the task to be achieved by the present invention is to provide an optical information recording medium in which jitter can be kept small even when the thickness of the Al-based alloy reflective film is increased. A target standard value of the increased film thickness is set to "25 nm or more". If the thickness is in the vicinity of 25 nm or more, there is no great reflectivity variation due to the film thickness. As a result, it is possible to ensure a high reflection characteristic, and also prevent the deterioration of the reflection characteristic after the acceleration environment test.

If consideration is given to the reflection characteristic and durability, the thickness of the Al-based alloy reflective film is preferably larger (e.g., 30 nm or more). However, if the thickness of the Al-based alloy reflective film is excessively large, the producibility of the optical information recording medium decreases, and jitter also tends to increase. Accordingly, in consideration of a balance therebetween, the upper limit is preferably controlled to a level of approximately 100 nm.

To control Ra for the Al-based alloy reflective film used in the present invention as described above, it is preferable to use an Al-based alloy having, e.g., either of the compositions (1) and (2) shown below.

(1) An Al-based alloy (which may be hereinafter referred to as a "first Al-based alloy") containing at least one selected from the group consisting of Ti, Ta, Cr, W, Mo, Nb, and V in an amount of 7.0 to 20 percent.

Each of Ti, Ta, Cr, W, Mo, Nb, and V is a refractory metal which contributes to refinement of a surface crystal. By using one of these refractory elements alone or two or more thereof in combination, Ra can be reduced to 0.5 nm or less.

In the case of using two or more of the elements mentioned above, it is preferable to control a total amount thereof to the range of 7.0 to 20 percent. When the total amount of the elements mentioned above is less than 7.0 percent, a jitter reducing action is unsatisfactory and, when the thickness of the Al-based alloy reflective film is set to 25 nm or more as in the present invention, jitter increases. On the other hand, when the total amount of the elements mentioned above exceeds 20 percent, the reflection characteristic deteriorates, and a signal intensity necessary for reading from the optical disc cannot be obtained. A preferred lower limit of the total amount of the elements mentioned above is 12 percent, while a preferred upper limit thereof is 18 percent.

In the case where one of the seven types of elements mentioned above in (1) is used alone, the composition thereof is preferably controlled as shown below in (i) to (vii) depending on the type of the element, whereby the action mentioned above is effectively achieved.

(i) Ti: 9 to 19 percent (a preferred lower limit thereof is 12 percent, and a preferred upper limit thereof is 17 percent)

(ii) Ta: 8 to 13 percent (a preferred lower limit thereof is 9 percent, and a preferred upper limit thereof is 12 percent)

(iii) Cr: 10 to 18 percent (a preferred lower limit thereof is 12 percent, and a preferred upper limit thereof is 16 percent)

(iv) W: 8 to 16 percent (a preferred lower limit thereof is 10 percent, and a preferred upper limit thereof is 15 percent)

(v) Mo: 10 to 20 percent (a preferred lower limit thereof is 11 percent, and a preferred upper limit thereof is 17 percent)

(vi) Nb: 8 to 16 percent (a preferred lower limit thereof is 10 percent, and a preferred upper limit thereof is 15 percent)

(vii) V: 8 to 15 percent (a preferred lower limit thereof is 10 percent, and a preferred upper limit thereof is 14 percent)

(2) An Al-based alloy (which may be hereinafter referred to as a "second Al-based Alloy") containing at least one selected from the group consisting of Ti, Ta, Cr, W, Mo, Nb, and V in an amount of 4 to 20 percent, and containing a rare earth element in an amount of 5 to 15 percent The second Al-based alloy mentioned above contains both of the first Al-based alloy mentioned above and the rare earth element. The rare earth element is also an element which contributes to refinement of a surface crystal, similarly to each of the elements (Ti, Ta, Cr, W, Mo, Nb, and V) forming the first Al-based alloy. By using the rare earth element in combination with the element mentioned above such as Ti, a refining action is remarkably achieved.

Rare earth elements used in the present invention mean a group of elements obtained by adding scandium (Sc) and Y yttrium to lanthanide elements (a total of fifteen elements from La with an atomic number of 57 to Lu with an atomic number of 71 in the periodic table). Each of these elements may be used alone, or two or more thereof may also be used in combination. Among these elements, the use of, e.g., Nd, Sm, Y, La, Gd, or Pr is preferred, and one of them or two or more thereof can be used in an arbitrary combination.

The content of the rare earth element is preferably controlled to the range of 5 to 15 percent. When the content of the rare earth element is less than 5 percent, the jitter reducing action is unsatisfactory and, when the thickness of the Al-based alloy reflective film is set to 25 nm or more as in the present embodiment, jitter increases. On the other hand, when the content of the rare earth element exceeds 15 percent, reflectivity decreases, and the signal intensity necessary for reading from the optical disc cannot be obtained. A more preferred lower limit of the content of the rare earth element is 6 percent, and a more preferred upper limit thereof is 13 percent.

Thus, the first and second Al-based alloys used appropriately in the present invention have been described. In these Al-based alloys, an impurity inevitably introduced in a manufacturing process or the like is also contained.

To the first and second Al-based alloys mentioned above, not only the elements which contribute to the reduction of Ra mentioned above, but also an element other than those mentioned above may also be further added to a degree which does not inhibit the action of these elements for the purpose of giving another characteristic required of the reflective film.

Specifically, to the first Al-based alloy and second Al-based alloy mentioned above, at least one selected from the group consisting of Cu, Ge, Zn, Fe, and Mg, e.g., may also be added in an amount in the range of 1.0 to 5.0 percent. The foregoing elements such as Cu are elements which contribute to an improvement in durability. Since the progress of the oxidation of Al is inhibited by the reinforcement of a passivation film on the surface of Al, the deterioration of the reflection characteristic after the environment test is inhibited. Additionally, by adding these durability improving elements, an excellent surface refining action of the first and second Al-based alloys can also be effectively achieved without undergoing change.

To allow effective achievement of a durability improving action by the elements mentioned above, a total content of one or two or more of Cu, Ge, Zn, Fe, and Mg is preferably controlled to the range of 1 to 5 percent. When the content of the elements mentioned above is less than 1 percent, the durability improving action is unsatisfactory. On the other hand, when the content of the elements mentioned above exceeds 5 percent, there is the problem of a reduction in initial reflectivity or the like. More preferably, the content of the elements mentioned above is 3 percent or less.

The Al-based alloys used in the present invention are each useful as a material of a reflective film for an optical disc, and applicable to an optical disc having one or more recording layers.

Thus, the Al-based alloys used in the present invention have been described.

The read-only optical information recording medium of the present invention is characterized in that the Al-based alloy reflective film having the properly controlled Ra and thickness is used therein. The structure and type (type of the light transmission layer, the substrate, or the like) of the optical disc to which the Al-based alloy reflective film is applied are not particularly limited, and a typically used optical disc can be adopted.

The type of the substrate used in the present invention is not particularly limited, and a resin generally used for a substrate for optical disc, such as, e.g., a polycarbonate resin or an acrylic resin can be used. If consideration is given to price, a mechanical characteristic, and the like, the use of polycarbonate is preferred.

Preferably, the thickness of the substrate is approximately in the range of 0.4 to 1.2 mm. Preferably, the depths of pits formed in the substrate are approximately in the range of 50 to 100 nm.

The type of the light transmission layer used in the present invention is not limited, either. For example, a UV setting resin, a polycarbonate resin, or the like can be used. In a single-layer optical disc, the thickness of the light transmission layer is preferably about 100 µm. In a double-layer optical disc, the thickness of a first light transmission layer is preferably about 25 µm, and the thickness of a second light transmission layer is preferably about 75 µm.

The Al-based alloy reflective film used in the present invention can be deposited by, e.g., a sputtering method, a vapor deposition method, or the like, but a sputtering method is preferred. This is because, by a sputtering method, the alloy elements mentioned above are uniformly dispersed in an Al matrix so that a homogeneous film is obtainable, and stable optical characteristics and durability are obtainable.

A sputtering target used in the sputtering method can be manufactured by any of a melting/casting method, a powder sintering method, a spray foaming method, and the like. However, if consideration is given to producibility and the like, the use of the powder sintering method is preferred.

EXAMPLES

Hereinbelow, the present invention will be described more specifically by showing Examples thereof. However, the present invention is not limited by Examples shown below, and can also be practiced making appropriate changes therein as long as the changes can comply with the gist thereof described above and below. The changes are all included in the technical scope of the present invention.

Example 1

First, using an Ni stamper having lands/pits, polycarbonate was injection molded, whereby a substrate having a thickness of 1.1 mm was obtained. After pure metal chips of the various elements shown in Table 1 were placed on Al targets (pure Al, an alloy of Al and 6.0% Nd, or an alloy of Al, 6.0% Nd, and 1.0% Ta was used), various Al-based alloy reflective films having thicknesses of 15 to 40 nm were formed by DC magnetron sputtering on the obtained substrate, as shown in Table 1. Specifically, the target of pure Al was used when the Al-based alloy reflective films of Nos. 1 to 27, 29, 30, and 35 of Table 1 were formed, the target of the alloy of Al, 6.0% Nd, and 1.0% Ta was used when the Al-based alloy reflective films of Nos. 31 to 34 of Table 1 were formed, and the target of the alloy of Al and 6.0% Nd was used when the Al-based alloy reflective film of No. 28 of Table 1 was formed. Sputtering conditions were set such that an Ar gas flow rate was 20 sccm, an Ar gas pressure was 2 mTorr, a film deposition power was DC 400 W, and an ultimate degree of vacuum was $2.0 \times 10^{-6}$ Torr or less. The thickness of the reflective film was controlled by varying a sputtering time.

A portion of each of the various reflective films thus obtained was subjected to the measurement of an arithmetical mean roughness (Ra). Specifically, as samples for the Ra measurement, samples were prepared in which each of the various Al-based alloy reflective films was formed on a glass substrate of 1.1 mm in the same manner as described above, and the Ra was measured based on the method described above.

Then, a UV setting resin was coated by a spin coating method so as to have a thickness of 100 μm. Thereafter, the resin was cured by UV irradiation, whereby a single-layer BD-ROM was obtained.

The following characteristics of the single-layer BD-ROM thus obtained were evaluated.

(Measurement of Reflectivity)

To measure reflectivity, reading was performed with a read power of 0.35 mW using ODU-1000 commercially available from Pulstec Industrial Co., Ltd., and the maximum levels (reflection intensities in mV as the unit thereof) of reflection signals were measured using a digital oscilloscope (under the tradename of DL1640L) commercially available from Yokogawa Electric Corporation. The reflection intensities were defined as "reflectivities". In the present example, a single-layer BD-ROM having a reflection intensity of 950 mV or more was determined to be acceptable.

(Evaluation of Durability)

To a portion of each of the produced BD-ROMs, an acceleration environment test was performed in which the BD-ROMs were held in atmospheric air at a temperature of 80° C. and a relative humidity of 85% for 240 hours. The reflection intensities before and after the test were measured, and the BD-ROM having the rate (absolute value) of change in the reflection intensities before and after the test being 10.0 percent or less (absolute value) was determined to be acceptable.

(Measurement of Jitter)

Using ODU-1000 commercially available from Pulstec Industrial Co., Ltd. and TA810 commercially available from Yokogawa Electric Corporation, jitters were measured under the following conditions. In the present example, the BD-ROM having jitter of 12 percent or less was determined to "have excellent reading stability".

Reading Laser Power: 0.35 mW
Disc Rotation Speed: 4.98 m/s
Aberration: Adjusted to Maximize Reflectivity (Tilt Condition: 0)

Further, to some of the samples, the acceleration environment test described above in "Evaluation of Durability" was performed, and the jitters after the test were measured. The BD-ROM having jitter of 12 percent or less after the test was evaluated to "have extremely excellent reading stability".

The results of these measurements and evaluation are shown in Tables 1 to 3.

Table 1 shows the thicknesses of reflective films in all the samples obtained in the present example, and the results of measuring the jitters and reflection intensities of the BD-ROMs before the acceleration environment test. Table 2 shows the samples extracted from Table 1, for which the Ra of the reflective films had been measured. Table 3 shows the samples extracted from Table 1, for which the jitters and reflection intensities of the BD-ROMs before and after the acceleration environment test had been measured. The Nos. in Tables 2 and 3 are the same as the Nos. in Table 1.

TABLE 1

| | | Before test | | |
|---|---|---|---|---|
| No. | Composition | Reflective film Thickness (nm) | Jitter (%) | Reflection intensity (mV) |
| 1 | Pure Al | 15 | 7.3 | 974 |
| 2 | Pure Al | 30 | 23.0 | 1620 |
| 3 | Pure Al | 40 | 24.0 | 1670 |
| 4 | Al—2.5% Ti | 15 | 7.6 | 1050 |
| 5 | Al—2.5% Ti | 30 | 12.0 | 1250 |
| 6 | Al—2.5% Ti | 40 | 24.0 | 1600 |
| 7 | Al—4.0% Ti | 40 | 21.0 | 1460 |
| 8 | Al—9.3% Ti | 15 | 8.0 | 830 |
| 9 | Al—9.3% Ti | 30 | 11.0 | 1280 |
| 10 | Al—9.3% Ti | 40 | 12.0 | 1320 |
| 11 | Al—14.4% Ti | 15 | 7.7 | 680 |
| 12 | Al—14.4% Ti | 30 | 8.2 | 1100 |
| 13 | Al—14.4% Ti | 40 | 10.0 | 1150 |
| 14 | Al—24.4% Ti | 40 | 9.1 | 850 |
| 15 | Al—6.5% Ta | 40 | 16.0 | 1300 |
| 16 | Al—10.1% Ta | 15 | 8.2 | 660 |
| 17 | Al—10.1% Ta | 30 | 8.6 | 1050 |
| 18 | Al—10.1% Ta | 40 | 11.0 | 1120 |
| 19 | Al—24.4% Ta | 40 | 9.1 | 850 |
| 20 | Al—12.9% Cr | 40 | 10.6 | 1180 |
| 21 | Al—11.7% V | 40 | 8.5 | 1090 |
| 22 | Al—9.6% Nb | 40 | 10.1 | 1200 |
| 23 | Al—10.8% Mo | 40 | 9.1 | 1130 |
| 24 | Al—10.2% W | 40 | 8.9 | 1080 |
| 25 | Al—1.4% Ti—2.3% Ta | 40 | 18.0 | 1462 |

TABLE 1-continued

| | | Reflective film Thickness (nm) | Before test | |
|---|---|---|---|---|
| No. | Composition | | Jitter (%) | Reflection intensity (mV) |
| 26 | Al—6.4% Ti—11.3% Ta | 40 | 9.3 | 1050 |
| 27 | Al—6.6% Ti—4.7% V | 40 | 9.1 | 980 |
| 28 | Al—8.1% Ti—6.0% Nd | 40 | 8.9 | 1060 |
| 29 | Al—4.6% Ti—5.0% Gd | 40 | 8.5 | 1030 |
| 30 | Al—5.8% Ti—5.0% Y | 40 | 9.2 | 1080 |
| 31 | Al—1.0% Ta—6.8% Cr—6.0% Nd | 40 | 10.2 | 1200 |
| 32 | Al—1.0% Ta—9.5% Cr—6.0% Nd | 40 | 8.7 | 1140 |
| 33 | Al—5.7% Ti—1.0% Ta—6.0% Nd | 40 | 9.7 | 1170 |
| 34 | Al—8.3% Ti—1.0% Ta—6.0% Nd | 40 | 8.8 | 1090 |
| 35 | Al—14.3% Ti—2.2% Fe | 40 | 9.8 | 1020 |

TABLE 2

| | | Reflective film | | Before test | |
|---|---|---|---|---|---|
| No. | Composition | Thickness (nm) | Ra (nm) | Jitter (%) | Reflection intensity (mV) |
| 1 | Pure Al | 15 | 1.40 | 7.3 | 974 |
| 2 | Pure Al | 30 | 2.00 | 23.0 | 1620 |
| 3 | Pure Al | 40 | 2.30 | 24.0 | 1670 |
| 6 | Al—2.5% Ti | 40 | 1.50 | 24.0 | 1600 |
| 7 | Al—4.0% Ti | 40 | 1.20 | 21.0 | 1460 |
| 10 | Al—9.3% Ti | 40 | 0.48 | 12.0 | 1320 |
| 15 | Al—6.5% Ta | 40 | 1.10 | 16.0 | 1300 |
| 18 | Al—10.1% Ta | 40 | 0.41 | 11.0 | 1120 |
| 20 | Al—12.9% Cr | 40 | 0.31 | 10.6 | 1180 |
| 21 | Al—11.7% V | 40 | 0.20 | 8.5 | 1090 |
| 22 | Al—9.6% Nb | 40 | 0.28 | 10.1 | 1200 |
| 23 | Al—10.8% Mo | 40 | 0.43 | 9.1 | 1130 |
| 24 | Al—10.2% W | 40 | 0.36 | 8.9 | 1080 |
| 28 | Al—8.1% Ti—6.0% Nd | 40 | 0.18 | 8.9 | 1060 |
| 31 | Al—1.0% Ta—6.8% Cr—6.0% Nd | 40 | 0.19 | 10.2 | 1200 |
| 32 | Al—1.0% Ta—9.5% Cr—6.0% Nd | 40 | 0.18 | 8.7 | 1140 |
| 33 | Al—5.7% Ti—1.0% Ta—6.0% Nd | 40 | 0.21 | 9.7 | 1170 |
| 34 | Al—8.3% Ti—1.0% Ta—6.0% Nd | 40 | 0.18 | 8.8 | 1090 |

TABLE 3

| | | Reflective film Thickness (nm) | Before test | | After test | | Rate of change of reflection intensity |
|---|---|---|---|---|---|---|---|
| No. | Composition | | Jitter (%) | Reflection intensity (mV) | Jitter (%) | Reflection intensity (mV) | |
| 1 | Pure Al | 15 | 7.3 | 974 | 18.0 | 895 | −8.1 |
| 2 | Pure Al | 30 | 23.0 | 1620 | 24.0 | 1600 | −1.2 |
| 3 | Pure Al | 40 | 24.0 | 1670 | 24.0 | 1680 | 0.6 |
| 4 | Al—2.5% Ti | 15 | 7.6 | 1050 | 7.5 | 940 | −10.5 |
| 5 | Al—2.5% Ti | 30 | 12.0 | 1250 | 10.2 | 1200 | −4.0 |
| 6 | Al—2.5% Ti | 40 | 24.0 | 1600 | 22.0 | 1530 | −4.4 |
| 8 | Al—9.3% Ti | 15 | 8.0 | 830 | 7.8 | 730 | −12.0 |
| 9 | Al—9.3% Ti | 30 | 11.0 | 1280 | 8.2 | 1210 | −5.5 |
| 10 | Al—9.3% Ti | 40 | 12.0 | 1320 | 10.8 | 1250 | −5.3 |
| 11 | Al—14.4% Ti | 15 | 7.7 | 680 | 7.5 | 590 | −13.2 |
| 12 | Al—14.4% Ti | 30 | 8.2 | 1100 | 8.2 | 1040 | −5.5 |
| 13 | Al—14.4% Ti | 40 | 10.0 | 1150 | 8.0 | 1130 | −1.7 |
| 15 | Al—6.5% Ta | 40 | 16.0 | 1300 | 11.0 | 1230 | −5.4 |
| 31 | Al—1.0% Ta—6.8% Cr—6.0% Nd | 40 | 10.2 | 1200 | 9.2 | 1140 | −5.0 |
| 32 | Al—1.0% Ta—9.5% Cr—6.0% Nd | 40 | 8.7 | 1140 | 8.4 | 1060 | −7.0 |
| 33 | Al—5.7% Ti—1.0% Ta—6.0% Nd | 40 | 9.7 | 1170 | 8.5 | 1100 | −6.0 |
| 34 | Al—8.3% Ti—1.0% Ta—6.0% Nd | 40 | 8.8 | 1090 | 8.2 | 1020 | −6.4 |

In Table 1, Nos. 4 to 27 are examples in each of which the first Al-based alloy used in the present invention was used, Nos. 4 to 24 are examples in each of which one element was added alone, and Nos. 25 to 27 are examples in each of which two elements were used in combination, while Nos. 28 to 34 are examples in each of which the second Al-based alloy used in the present invention was used. No. 35 is an example in which Fe was added as a durability improving element to the first Al-based alloy. Note that Nos. 1 to 3 are reference examples in each of which pure Al was used.

As shown in Table 2, in each of the examples in which the reflective films had Ra controlled within the range of the present invention, the jitter and reflection intensity before the test were as good as 12 percent or less and 950 mV or more and, even though the thickness of the reflective film was increased to 40 nm, BD-ROMs having an excellent balance between reading stability and a reflection characteristic were obtained.

By contrast, in each of the examples in which the contents of the alloy elements were outside the preferred range of the present invention and Ra accordingly increased, the jitter improving action based on the reduction of Ra was not effectively achieved, and jitter increased. In the examples in each of which pure Al was used, Ra was high so that, when the thickness of the reflective film was increased, jitters before and after the test increased.

In Table 1, the Ra of each of the reflective films is not shown but, if consideration is given to the result of Table 2 described above, it can be guessed that, in each of the examples of Table 1 in which jitter before the test had been controlled within the range of the present invention, the Ra of the reflective film was also controlled within the range of the present invention.

In each of the examples of Table 3 in which jitter before the test had been controlled within the range of the present invention, jitter after the test was also reduced to a low value of 12 percent or less. If consideration is given to the result of Table 2 described above, it can be guessed that, in each of such examples, the Ra of the reflective film was also controlled within the range of the present invention, and therefore it can be guessed that, by controlling the Ra of the reflective film, the jitters before and after the test can also be improved. It was also recognized that, in each of the examples in which the compositions of the alloys were controlled within the preferred range of the present invention, the rate of change of the reflection intensity after the test was low, and durability was also excellent.

While the present invention has been described with reference to the specific embodiments thereof, it is obvious to a person skilled in the art that various changes and modifications can be made in the present invention without departing from the spirit and scope of the present invention.

The present application is based on Japanese Patent Application (2007-242870) filed on Sep. 19, 2007, and the entire content of which is incorporated herein by reference.

In addition, all the references cited herein are incorporated in their entirety.

INDUSTRIAL APPLICABILITY

According to the present invention, there can be provided a read-only optical information recording medium which has a high reflectivity and low jitter, and preferably also has excellent durability.

The invention claimed is:

1. A read-only optical information recording medium comprising:
    at least one reflective film formed of an Al-based alloy; and
    at least one light transmission layer that are successively laminated on a substrate, wherein
    an arithmetical mean roughness Ra of the reflective film is 0.5 nm or less, and
    a thickness of the reflective film is 25 nm or more,
    wherein the Al-based alloy comprises 7.0 to 20 at % in total amount of at least one element selected from the group consisting of Ti, Ta, Cr, W, Mo, Nb, and V.

2. A read-only optical information recording medium according to claim 1, further comprising information readable with a blue laser.

3. A read-only optical information recording medium according to claim 1, comprising:
    a first reflective film formed on the substrate, said first reflective film being of an Al-based alloy, said first reflective film having an arithmetical mean roughness Ra of 0.5 nm or less and a thickness of 25 nm or more;
    a first light transmission layer on said first reflective film;
    a second reflective film formed on the first light transmission layer, said second reflective film being of an Al-based alloy, said second reflective film having an arithmetical mean roughness Ra of 0.5 nm or less and a thickness of 25 nm or more; and
    a second light transmission layer on said second reflective film
    wherein the Al-based alloy comprises 7.0 to 20 at % in total amount of at least one element selected from the group consisting of Ti, Ta, Cr, W, Mo, Nb, and V.

4. A read-only optical information recording medium according to claim 3, further comprising information readable with a blue laser.

* * * * *